United States Patent
Allison et al.

(10) Patent No.: US 7,600,111 B2
(45) Date of Patent: Oct. 6, 2009

(54) METHOD OF RESTARTING A COMPUTER PLATFORM

(75) Inventors: Michael S. Allison, Ft. Collins, CO (US); John A. Morrison, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 560 days.

(21) Appl. No.: 11/523,870

(22) Filed: Sep. 20, 2006

(65) Prior Publication Data

US 2008/0072026 A1    Mar. 20, 2008

(51) Int. Cl.
*G06F 15/177* (2006.01)

(52) U.S. Cl. .................................. 713/2; 713/1; 713/100

(58) Field of Classification Search ...................... 713/1, 713/2, 100
See application file for complete search history.

(56) References Cited

U.S. PATENT DOCUMENTS

| 6,990,574 | B2 * | 1/2006 | Bidarahalli et al. | 713/2 |
| 7,240,189 | B2 * | 7/2007 | Mowery et al. | 713/2 |
| 7,502,803 | B2 * | 3/2009 | Culter et al. | 707/101 |
| 2008/0072028 | A1 * | 3/2008 | Allison et al. | 713/1 |

* cited by examiner

Primary Examiner—Dennis M Butler

(57) ABSTRACT

Provided is a method for restarting a computing platform to a state in which applications run in less time than an initial start, comprising powering on a computing platform having a plurality of devices; identifying one or more of the devices which are not critical to running applications; storing information about the non-critical devices; restarting the computing platform; retrieving the information about the non-critical devices; disabling the non-critical devices; enabling devices which are not non-critical; and enabling the non-critical devices after the restart is completed.

6 Claims, 4 Drawing Sheets

METHOD OF RESTARTING A COMPUTER PLATFORM

BACKGROUND

Advanced Configuration and Power Interface (ACPI) is a specification that makes hardware status information available to an operating system (OS) in a computer, such as a laptop, desktop, server, etc. More information about ACPI may be found in the 600-plus page "Advanced Configuration and Power Interface Specification," Revision 3.0a, Dec. 30, 2005, cooperatively defined by Hewlett-Packard Corporation, Intel Corporation, Microsoft Corporation, Phoenix Technologies Ltd., and Toshiba Corporation, available at http://www.acpi.info/DOWNLOADS/ACPIspec30a.pdf. The ACPI specification was developed to establish industry common interfaces enabling robust OS-directed motherboard device configuration and power management of both devices and entire systems. ACPI is the key element in operating system-directed configuration and power management (OSPM).

ACPI is used in computing platforms running a variety of operating systems, and allows the operating system to manipulate hardware resources. For example, ACPI assists in power management by allowing a computer system's peripherals to be powered on and off for improved power management. ACPI also allows the computer system to be turned on and off by external devices. For example, the touch of a mouse or the press of a key may wake up a computer system in a sleep or stand-by mode using ACPI.

ACPI has its own source and machine languages, referred to as ACPI Source Language (ASL) and ACPI Machine Language (AML), respectively. ASL is used to write new ACPI control methods, whereby ACPI is used by an OS to control new devices, or to control devices in new ways. ACPI comprises both static and interpretable tables containing device information. When the computing platform is powered on or restarted, the system firmware (such as the BIOS, or Basic Input/Output System) constructs the static tables, which are used by the OS. The interpretable tables are composed of AML, which is merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional approach can lack flexibility in controlling various configurations of a computing platform.

An ACPI namespace is a hierarchical tree structure in OS-controlled memory that contains named objects. These objects may be data objects, control method objects, bus/device package objects, and so on. The OS dynamically changes the contents of the namespace by loading and/or unloading definition blocks from the ACPI tables. Information in the ACPI namespace comes from a differentiated system description table (DSDT), which contains the differentiated definition block, and one or more other definition blocks. An original equipment manufacturer (OEM) typically supplies a DSDT to an ACPI-compatible OS, which supplies the implementation and configuration information about the base system. The OS inserts the DSDT information into the ACPI namespace at system boot time and doesn't remove it.

Another ACPI construct is the secondary system description table (SSDT). Multiple SSDTs can be used as part of a platform description. After the DSDT is loaded into the ACPI namespace, each secondary description table with a unique OEM Table ID is loaded. This allows the OEM to provide the base support in one table, while adding smaller system options in other tables. Additional tables can only add data; they cannot overwrite or remove data from previous tables.

Another construct in the ACPI architecture is defined by the system abstract layer (SAL); and is called a firmware interface table (FIT). The FIT contains starting addresses and sizes for the firmware components that are outside the protected boot block. A good overview of the FIT entry specification may be found in the "Intel® Itanium® Processor Family System Abstraction Layer Specification", Document No. 245359-007, (Intel December 2003), available at http://www.intel.com/design/itanium/downloads/24535907.pdf.

SUMMARY

Presented is a method of restarting a computer platform after an initial boot, to reboot more quickly than initially to a state in which an application can be run. An Advanced Configuration and Power Interface (ACPI) control method is introduced for marking devices that are not critical for booting the OS to execute applications. Such devices can comprise, for example, processors, memory, and/or input/output (I/O) devices. The operating system (OS) invokes the ACPI control method to mark such devices. The computing platform retains this information in a data store for the next time the computer platform is powered on or restarted. On the next start, the non-critical device information is retrieved. ACPI tables then built by the computing platform identify all of the devices for the OS, but those devices that were marked as not critical for boot are disabled, and the OS boots without them, thereby saving OS booting time. Once the OS is booted, the platform can run applications. The computing platform notifies the OS to perform ACPI on-line add operations to add the devices marked non-critical to the booted OS, after which the OS can use those devices. Devices can also be marked by the OS as non-critical after the occurrence of events other than startup, such as when configuration changes occur, or when device errors are detected. This enables the OS to continually identify criticality of devices. The non-critical resources stored by the platform preferably can also be reset by a user to a default configuration, such as to the factory default settings, for example, in case the resources are incorrectly set.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Provided is a mechanism that uses a new ACPI control method in conjunction with ACPI on-line add features whereby an OS of a restarted computing platform boots faster than an initial boot, to the point of being able to run an application. The new ACPI control method is invoked by the OS to identify devices that do not need to be booted to run the application. The computing platform retains non-critical device information for use the next time the computing platform is started. The next time the computing platform is started, the platform retrieves the non-critical device information, and ACPI tables built by the platform identify all of the devices, but those devices that were specified as not critical are disabled in the ACPI tables. The OS uses the ACPI tables to boot. After the OS boots, it cannot use the disabled devices, but it is able to run applications, and it has achieved a state in which it can run applications more quickly than if it had booted with all devices enabled. The platform then performs ACPI on-line add operations to add the non-critical devices to the booted OS. Once all of the devices have been added, the OS is fully operational. In this way, the OS boots faster to the point where it can start processing applications.

The OS also invokes the new ACPI control method after the occurrence of events other than startup that affect the operation of devices, such as configuration changes, device errors, and the like. Thereby, the OS continually identifies the criticality of devices.

Figure 1:
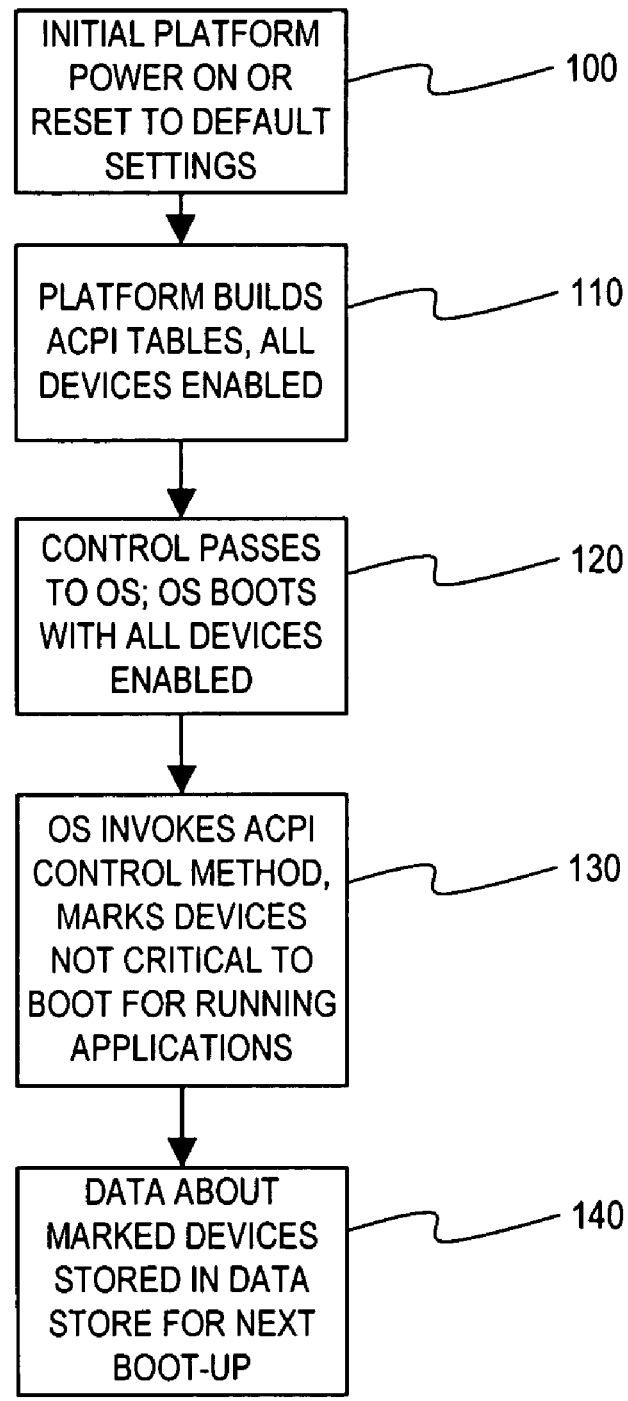
FIG. 1 shows a method for a computing platform to mark non-critical devices using an ACPI control method, in accordance with an exemplary embodiment of the invention.

FIG. 1 shows a method for a computing platform to mark non-critical devices. The platform is initially powered on, such as by pressing an "on" button, or is reset to a default configuration such as original factory settings (step 100). The platform then builds ACPI tables in the conventional way, enabling all devices (step 110). After the ACPI tables are built, control passes to the OS, which uses the tables to boot with all devices enabled (step 120). The OS invokes an ACPI method for marking devices that are not critical for running applications as non-critical devices (step 130). The method can consist of AML code that can directly store the non-critical device information or can make a call into the system firmware (such as a BIOS, or basic input/output system) to perform the operation. Information of the marked devices is stored in a data store, such as a non-volatile memory, for use the next boot-up, such as the next time the computer platform power is cycled off and on. Other storage devices can be used, but using non-volatile memory for storing the information advantageously allows the user to choose the stored information when restarting the computing platform, or to reset the information to a default configuration if required or desired.

Figure 2:
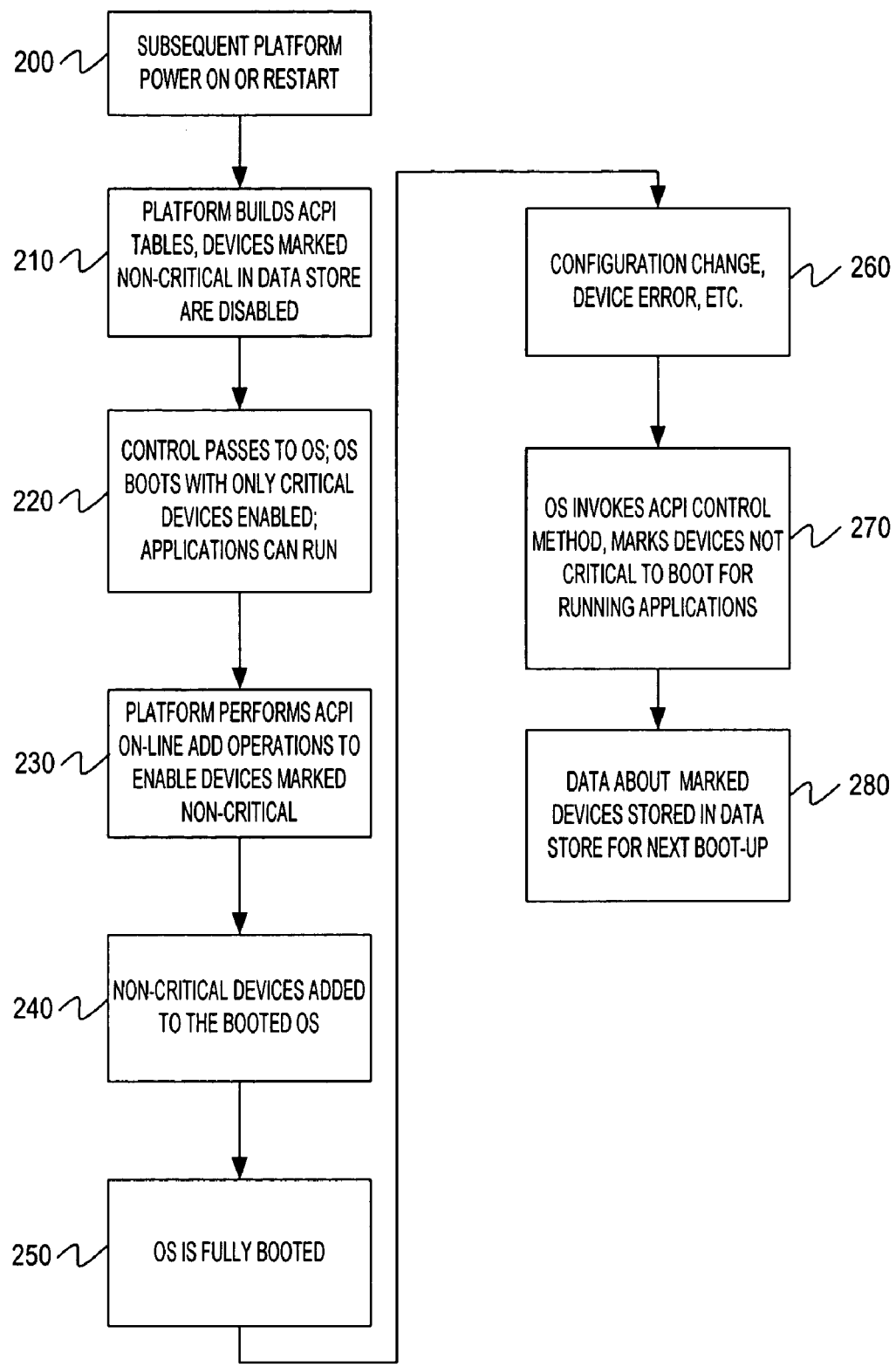
FIG. 2 shows a method for a computing platform to boot with non-critical devices disabled in ACPI tables until the OS is booted, in accordance with an exemplary embodiment of the invention.

FIG. 2 shows a method for a computing platform to start with non-critical devices disabled in ACPI tables until the OS is booted. The computing platform is started subsequent to an initial power on or reset to default settings as in FIG. 1, such as by powering on after shutdown, or pressing a "restart" button (step 200). The platform retrieves from the data store the information of the devices marked non-critical, and builds ACPI tables with all devices identified, but with the non-critical devices disabled (step 210). After the ACPI tables are built, control passes to the OS. The OS boots with the non-critical devices disabled, in other words, with only critical devices enabled. Applications can then run (step 220). The computing platform then performs ACPI on-line add operations to enable the devices marked non-critical in the ACPI tables as initially reported to the OS (step 230), thereby avoiding race conditions in which the OS tries to modify the list of non-critical devices before the computing platform completes the on-line additions. The non-critical devices are then added to the booted OS (step 240), whereupon the OS is fully booted (step 250). The OS monitors the computer platform for an event that alters the availability or criticality of devices, such as a configuration change or a device error, for example (Step 260). If such an alteration is detected, the OS invokes the new ACPI control method and again marks devices not critical to boot for running applications (step 270). The OS flushes the prior non-critical device information in the data store, and stores information of the newly marked non-critical devices in the data store for use in the next boot-up (step 280).

Figure 3:
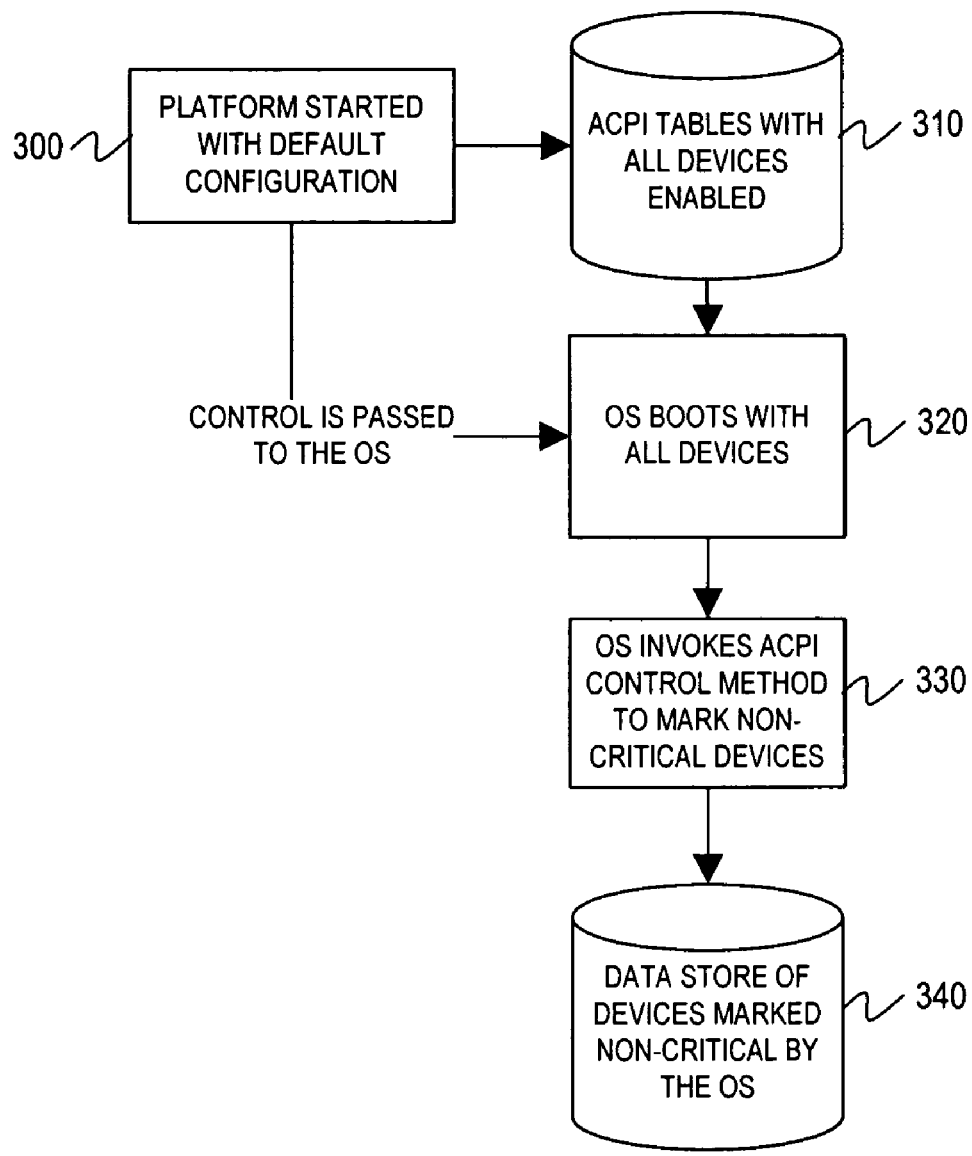
FIG. 3 shows a method for the OS to mark non-critical devices, in accordance with an exemplary embodiment of the invention.

FIG. 3 shows a method for the OS to mark non-critical devices upon startup with default settings. The computing platform is started with a default configuration, such as by turning it on for the first time or resetting to its default settings (300). The platform builds ACPI tables (310) with all devices enabled. Control is passed to the OS, which boots with all devices (320). The booted OS invokes an ACPI control method to mark devices which are non-critical to running an application (330). Information of the non-critical devices is stored in data store (340).

Figure 4:
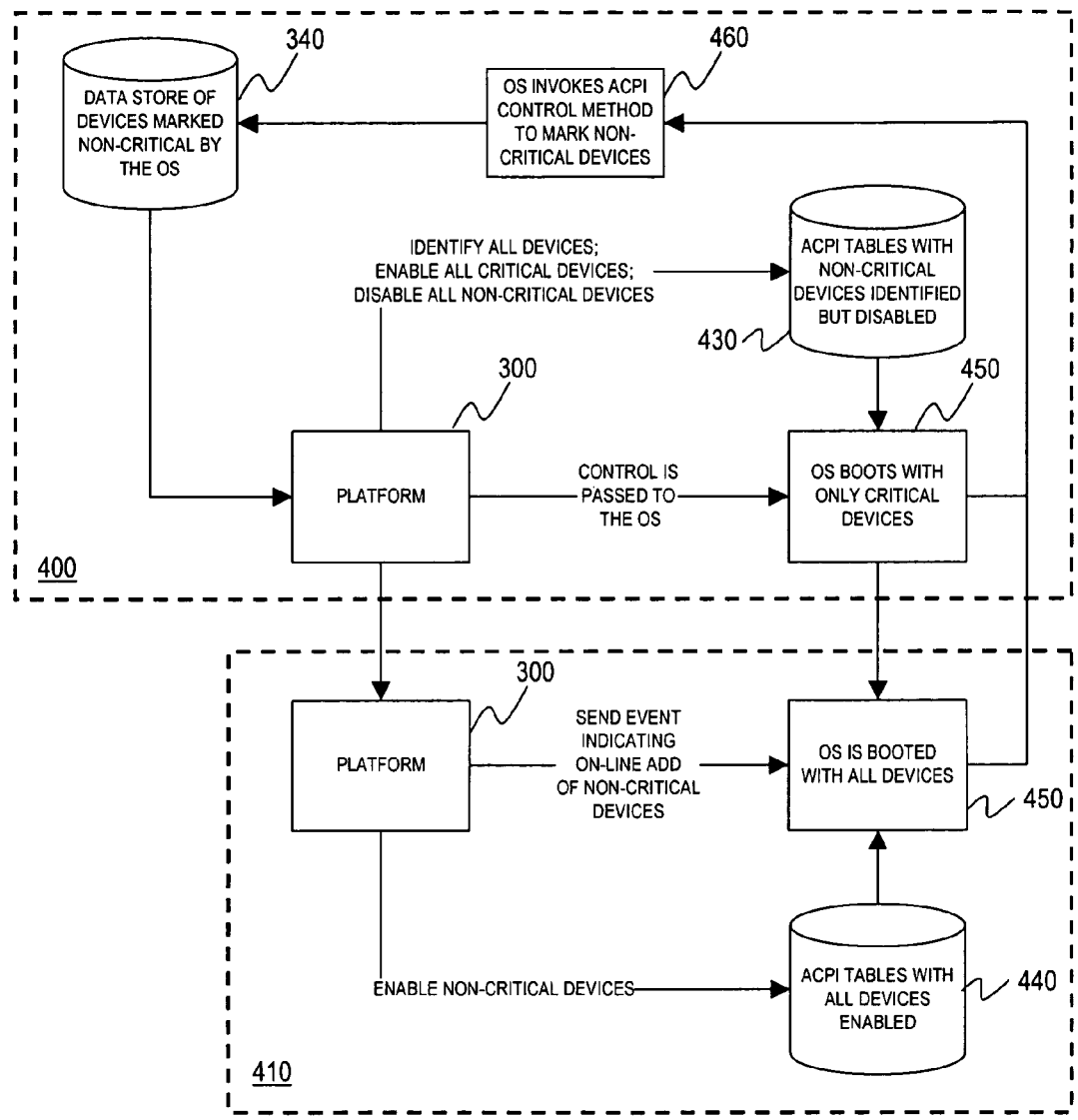
FIG. 4 shows a method for booting an OS with non-critical devices disabled in ACPI tables, thereafter enabling and adding the non-critical devices, in accordance with an exemplary embodiment of the invention.

FIG. 4 shows a method for booting an OS with non-critical devices disabled in ACPI tables (400), thereafter enabling the non-critical devices (410). After an initial startup as in FIG. 3, upon restarting, computing platform 300 retrieves the information of the non-critical devices stored in data store 340. Platform 300 uses the information to build ACPI tables with all devices identified, but with the non-critical devices disabled and only the remaining, critical, devices enabled. Control is passed to the OS, which boots with only the critical devices (430). After booting with the critical devices (400), the computing platform is able to run an application, such as a user program, but cannot use the non-critical devices. The OS then gains control of the non-critical devices (410). To do this, the platform enables the non-critical devices in the ACPI tables, so that the ACPI tables have all devices enabled (440). The platform sends an event to the OS directing it to use an ACPI on-line add function to add non-critical devices. The OS then adds the non-critical devices, and is booted with all devices (450). After the OS boots, either with only critical devices or with all devices, the OS monitors the computer platform for an event that alters the availability or criticality of devices for the next boot. If such an alteration is detected, the OS invokes the new ACPI method and again marks devices not critical to boot for running applications (460). The OS flushes the prior non-critical device information, and stores information of the newly marked non-critical devices in the data store (340) for use in the next boot-up.

In accordance with the invention, after an initial boot the computing platform can be restarted with a minimum set of devices, so that the OS boots as quickly as possible. In addition, the OS monitors for resources to be enabled or disabled at the next boot. This makes the invention usable in any OS that uses ACPI.

All patents, patent applications, publications, and other references cited or described in this document are hereby incorporated herein by reference, in their entirety.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for restarting a computing platform to a state in which applications run in less time than an initial start, comprising:
   powering on a computing platform comprising a plurality of devices;
   identifying one or more devices of the plurality of devices which are not critical to running applications;
   storing information about the non-critical devices;
   restarting the computing platform;
   retrieving the information about the non-critical devices;
   disabling the non-critical devices;
   enabling devices of the plurality of devices which are not non-critical devices; and
   enabling the non-critical devices after the restart is completed.

2. The method of claim 1, wherein the identifying step occurs after at least one of initial boot-up, a configuration change, and detection of a device error.

3. A method for a computing platform to mark devices not critical to running an application, wherein the computing platform has an operating system (OS) that uses the Advanced Configuration and Power Interface (ACPI); comprising:
   providing an ACPI control method for identifying non-critical devices;
   powering on the computing platform comprising a plurality of devices;
   providing ACPI tables with all devices enabled;
   passing control to the OS;
   booting the OS with all devices;
   invoking the ACPI control method to identify devices which are not critical for running an application as non-critical devices; and
   storing information about the non-critical devices.

4. The method of claim 3, wherein the invoking step occurs after at least one of initial boot-up, a configuration change, a reset to default settings, and detection of a device error.

5. The method of claim 3, further comprising:
   restarting the computer platform;
   retrieving the information about the non-critical devices;
   providing ACPI tables wherein:
      all devices are identified;
      non-critical devices are disabled; and
      devices which are not non-critical are enabled;
   passing control to the OS;
   booting the OS with the critical devices;
   enabling the non-critical devices in the ACPI tables;
   sending an event to the OS to use an on-line add operation to add each non-critical device; and
   using an on-line add operation to add each non-critical device after booting the OS with the critical devices has been completed.

6. The method of claim 5 wherein the invoking step occurs after at least one of boot-up, a configuration change, and detection of a device error.

* * * * *